United States Patent Office 3,070,418
Patented Dec. 25, 1962

3,070,418
NON-CRYSTALLIZING METHYL VIOLET PASTE
Robert F. Bann, Somerville, and Norman W. Fiess, Ringoes, N.J., assignors to American Cyanamid Company, New York, N.Y., a corporation of Maine
No Drawing. Filed Feb. 5, 1960, Ser. No. 6,861
4 Claims. (Cl. 8—79)

This invention relates to fluid pastes of basic dyes and more particularly to aqueous, storage-stable, non-crystallizing fluid pastes of a basic dye known as methyl violet and to a process for producing the same.

Aqueous pastes of methyl violet (New Color Index No. 42,535) are extensively used as dyes for textiles, paper and the like and as pigments in the manufacture of ink, carbon paper and typewriter ribbons. However, for many years such pastes have presented vexing problems not only in storage but also in their use.

In usual commercial practice, these methyl violet pastes are isolated as a thick viscous solution containing a concentration of dye of from about 40% to about 70% of the commercial-strength dye when evaluated against a methyl violet powder. Herein, for purposes of identification, these pastes will be referred to as "isolated" or "salted-out" pastes. As such, they are well known in the art. Such pastes contain large amounts of materials other than the dye itself, the residue usually comprising water, various salts and a number of organic impurities. Although these materials do not enhance the dyeing strength, nevertheless such pastes are used commercially in this form in various applications. The paste also may be dried to obtain a powder. Wide application also is found for the resultant dye powder.

However, in use, particularly in the dyeing and shading of paper, it is necessary that the dye be readily soluble in water. Furthermore, the dye must be in a form wherein its strength may be easily and rapidly developed. In the past, the available commercial methyl violet pastes have presented several serious disadvantages. Although they can be fed volumetrically and can be dissolved more readily than the powder, they do not dissolve as readily as desired. Even more disadvantageous is their tendency on standing, even for short periods, to undergo a secondary separation of brine and their tendency to crystallize during extended shipping and storage periods.

Recently, a method of preventing this secondary separation has been proposed in U.S. application Serial No. 2,128, filed January 13, 1960, now abandoned, by J. C. Conger and G. S. Herrick. Therein, addition of certain organic solvents to such methyl violet pastes is shown to eliminate the problem of brine separation and the resultant necessity for reconstituting the pastes during use.

Although this represents a significant advance in the art, such improved pastes do not meet all of the desirable quality standards. For example, such pastes still exhibit a tendency to crystallize. Crystals of the methyl violet dyestuff may form. Perhaps even more disadvantageous, the composition itself often appears to crystallize although dyeing tests indicate the crystals and the original paste compositions both show about equal color values.

It is, therefore, a principal object of this invention to eliminate this tendency to crystallize from such pastes and compositions as those of the above-noted copending application. Further objects are to prepare stable, non-separating, non-crystallizing paste formulations of methyl violet which are fluid, highly-concentrated and readily water-soluble.

As disclosed in the hereinabove noted copending application, high-strength, fluid pastes of methyl violet free from the objectionable secondary separation may be conveniently prepared by incorporating in a paste which is otherwise conventionally isolated from a dimethyl aniline oxidation mixture, an amount of about 6% to about 20%, preferably some 8% to 10%, by weight of the isolated methyl violet-containing product of a suitable organic solvent. Thereafter, a suitable diluent such as water is added to adjust the product to the desired strength. Suitable solvents must be water-miscible or water-soluble and were disclosed as including lower alkyl ketones such as acetone, methyl ethyl ketone and the like; such saturated monohydric alcohols as methyl, ethyl and isopropyl alcohol; such glycol ethers as the methyl or ethyl ether of diethylene glycol, the butyl ether of diethylene glycol, the methyl ether of tripropylene glycol and the like; amides such as acetamide, dimethyl formamide, dimethyl acetamide and the like; and polyalkyl carbonates such as ethylene carbonate, propylene carbonate and the like.

The desired objects of the present invention have been accomplished to a surprisingly successful degree by a combination of two simple factors. The first is to control the pH of the organic-solvent containing product paste; the second, the addition of resorcinol in controlled amounts.

As to the first of these, the desired result is accomplished by maintaining the paste on the acid side within a practical though limited pH range. It has been found necessary to maintain the pH of the paste formulation between about 2.5 and about 4.5. More specifically, a pH of from about 3.1 to about 3.3 constitutes the preferred practice. The pH of the paste formulation may be adjusted by the addition of an acid such as hydrochloric acid, acetic acid, sulfuric acid, formic acid and the like. In general, however, hydrochloric acid is preferred since the methyl violet as synthesized exists in the form of the hydrochloride. The correct amount of aqueous hydrochloric acid solution, or the equivalent amount of another acid, is readily added to the tub containing the dye liquor. As to the second, it has been found also that the resorcinol should be added in sufficient but correct amount. This is discussed below.

It is not wholly understood what function the resorcinol performs. However, it does accomplish the desired result. Moreover, it is quite unexpected that this result should be obtained. It is even more surprising that resorcinol is the only one of the analagous phenols which has been found to produce stable, non-crystallizing pastes. Thus, while it might be expected that other polyhydroxy compounds similar to resorcinol (meta-dihydroxy benzene) might be successfully substituted therefore to obtain the non-crystallizing pastes of the present invention, this cannot be done. It was found that even such closely analagous materials as paradihydroxy benzene (hydroquinone), ortho-dihydroxy benzene (pyrocatechol), 1,3,5-trihydroxy benzene (phloroglucinol), 1,2,3-trihydroxy benzene (pyrogallol), 1,2,4-trihydroxy benzene, phenol sulfonic acids and 3-hydroxy-1-methyl-4-isopropyl benzene (thymol) do not work.

In the preparation of the stable, non-crystallizing pastes of the present invention, it is found that resorcinol should be employed in amounts of from about 0.4% to about 10.0% by weight of the finished paste formulation. However, from about 0.8% to about 1.0% by weight generally constitutes the preferred range. Addition of the resorcinol preferably is made to the methyl violet paste after the paste has been salted out from the conventional synthesis mixture. The pH of the paste is usually adjusted at this point to the desired level.

Methyl violet has been synthesized by several known methods. One known procedure is by oxidation of dimethyl aniline, treating the resultant crude product with hydrogen sulfide to precipitate any copper as insoluble copper sulfide, dissolving the methyl violet dye from the crude melt with water and filtering the resultant extract to remove any insolubles such as the copper sulfide precipitate and various organic impurities. A dye paste is then isolated from the mixture by conventional salting out as discussed above. At this point, the dye-containing material is in the form of a thick aqueous solution or paste. Usually this paste is then heated to some 50° to 60° C. and stirred to give a homogeneous solution. At this point, the organic solvent of the above-noted copending application is added, as is the resorcinol and pH adjusting hydrochloric or other acid of this invention. Finally, the resultant mixture is diluted with water to yield the finished paste formulation of the preferred strength.

In determining the amount of water, resorcinol and organic solvent which is to be added to form pastes of the present invention, the untreated methyl violet paste is evaluated for dyeing strength against a standard commercial dye powder. After the real dye content and dyeing strength of the paste has been determined, it is readily calculatable by those skilled in the art what amounts of the selected organic solvent, resorcinol and water will be required to obtain a finished paste formulation of the desired dye strength.

In order that the present invention may be more fully understood by those skilled in the art, the following illustrative, non-limiting examples are given. Therein, unless otherwise noted, all parts and percentages are by weight and temperatures are in degrees centigrade.

In all the examples, a sample of the same methyl violet paste obtained from commercial production, as described above, in known manner, by oxidizing dimethylaniline and then salting out the paste was used. It was tested for dye strength and found to be 61% when compared with a sample of a standard commercial strength powder.

*Example 1*

A portion of the above-noted paste containing 38 parts of real methyl violet is placed in a beaker, 10 parts of tripropylene glycol methyl ether is added and the mixture stirred until solution is obtained. This paste is heated to approximately 55° C., 0.8 part of resorcinol is added, the pH is adjusted to 3.9 with acetic acid and sufficient additional water is added to make a gross weight of 100 parts. After thorough mixing, a homogeneous paste is obtained. A sample is placed in a bottle and stored at 4° C. Examination of this sample at intervals over a period of four months discloses neither water separation nor crystallization of the paste composition.

*Example 2*

The procedure of Example 1 is repeated except that resorcinol is omitted and the pH of the solution is not adjusted. After storage for a period of several months, no separation is observed but crystal formation is noted.

*Example 3*

The procedure of Example 1 is repeated except that 0.4% resorcinol is used instead of the 0.8% employed in Example 1. Upon examination after a period of 144 hours at 4° C., no separation or crystallization is observed.

*Example 4*

The procedure of Example 1 is repeated except that 0.2% of resorcinol is used. After 144 hours' storage at 4° C., no water separation is apparent but some crystallization is observed.

*Example 5*

The procedure of Example 1 is repeated except that no resorcinol is added. After 144 hours' storage at 4° C., no water separation is apparent but many crystals are present indicating that the resorcinol is a necessary feature of the present invention.

*Example 6*

The procedure of Example 1 is repeated except that 4% of resorcinol is added. After 144 hours' storage at 4° C., no water separation is apparent and no crystallization of the paste formulation is observed.

*Example 7*

The procedure of Example 1 is repeated except that hydrochloric acid is used instead of acetic acid and the pH is adjusted to about 3.1. After storage for 144 hours at 4° C., no water separation or crystallization of the paste composition is observed.

*Example 8*

The procedure of Example 3 is repeated except that the acetic acid is replaced by hydrochloric acid and the pH is adjusted to about 3.3. After storage for 144 hours at 4° C., no water separation or crystallization of the paste composition is observed.

*Example 9*

The procedure of Example 4 is repeated except that hydrochloric acid instead of acetic acid is used to maintain the pH at the desired level. After storage for 144 hours at 4° C., no water separation or crystallization is observed.

*Example 10*

The procedure of Example 1 is repeated except that sulfuric acid is used instead of acetic acid to maintain the pH at the desired level. No water separation or crystallization is observed.

*Example 11*

The procedure of Example 3 is repeated except that sulfuric acid is used to maintain the pH at the desired level. No water separation or crystallization is observed.

*Example 12*

Example 4 is repeated substituting sulfuric acid for acetic acid in adjusting the pH level. No water separation or crystallization is observed.

*Example 13*

The procedure of Example 1 is repeated substituting 0.8 part of hydroquinone for the resorcinol. After 144 hours' storage at 4° C., the paste formulation shows crystallization.

*Example 14*

The procedure of Example 3 is repeated except that 0.4% hydroquinone is used in place of resorcinol. After storage for 144 hours at 4° C., crystallization is observed.

*Example 15*

The procedure of Example 4 is repeated except that 0.2% of hydroquinone is used in place of resorcinol. After 144 hours' storage at 4° C., crystallization is observed.

*Example 16*

The procedure of Example 1 is repeated except that 10% of resorcinol is added. After storage at 4° C., for 144 hours, no evidence of water separation or crystallization is observed.

In the basis of the foregoing discussion it will be seen that make-up of the improved pastes of the present invention may be summarized in the following table. For each "component" an amount will be selected within the range indicated such that the total "parts" will comprise 100. The parts are given as by weight. Therefore, the table also may be read as weight percent of the total paste.

| Component | Parts per hundred | |
|---|---|---|
| | Minimum | Maximum |
| Dye Paste | 70 | 93.6 |
| Solvent | 6 | 20 |
| m-Dihydroxybenzene | 0.4 | 10 |

It is to be understood that the numerical figures given as maxima and minima may vary slightly. The "dye paste" component is one such as the above-described "salted out" paste or its equivalent made in some other known manner.

We claim:

1. A stable, non-separating, non-crystallizing, fluid, aqueous dyestuff paste comprising methyl violet, a water-miscible organic solvent, and meta-dihydroxy benzene, said paste having a pH of 2.5 to 4.5.

2. A stable, non-separating, non-crystallizing, fluid, aqueous dyestuff paste comprising from about 93.6 to about 70 parts by weight of a methyl violet paste obtained by salting out the reaction mixture produced by oxidizing dimethyl aniline, from about 6 to about 20 parts by weight of at least one water-miscible organic solvent selected from the group consisting of monohydric alcohols, aliphatic ketones, glycol alkyl ethers, amides and polyalkyl carbonates, and from about 0.4 to about 10.0 parts by weight of meta-dihydroxy benzene, said paste having a pH of from about 2.5 to about 4.5.

3. A stable, non-separating, non-crystallizing, fluid, aqueous dyestuff paste comprising about 89.2% of isolated methyl violet paste, about 10% of the methyl ether of tripropylene glycol and about 0.8% of meta-dihydroxy benzene, said paste having a pH of 3.1 to 3.3 and all percentages being in weight percent of the total product.

4. A process for preparing a stable, non-separating, non-crystallizing, fluid, aqueous methyl violet paste which comprises adding to a methyl violet paste obtained by salting out the reaction mixture produced by oxidizing dimethyl aniline, from about 6% to about 20% of a water-miscible organic solvent selected from the group consisting of monohydric alcohols, aliphatic ketones, glycol alkyl ethers, amides and polyalkyl carbonates, then mixing therewith from about 0.4% to about 10.0% of meta-dihydroxy benzene, and sufficient acid to produce in the so-mixed paste a pH of from about 2.5 to about 4.5, all percentages being expressed as weight percent of the completed mixture.

References Cited in the file of this patent

UNITED STATES PATENTS

| | | |
|---|---|---|
| 1,016,295 | Sahm | Feb. 6, 1912 |
| 1,157,705 | Levinstein | Oct. 26, 1915 |
| 1,834,314 | Kern et al. | Dec. 1, 1931 |
| 2,118,432 | Gessler | May 24, 1938 |
| 2,489,537 | Neumann | Nov. 29, 1949 |
| 2,852,331 | Youse | Sept. 16, 1958 |
| 2,901,311 | Nusslein et al. | Aug. 25, 1959 |